US006709331B2

(12) United States Patent
Berman

(10) Patent No.: US 6,709,331 B2
(45) Date of Patent: Mar. 23, 2004

(54) METHOD AND APPARATUS FOR AGGREGATING GAMING EVENT PARTICIPATION

(75) Inventor: Bradley Berman, Minnetonka, MN (US)

(73) Assignee: King Show Games, LLC, Minnetonka, MN (US)

( * ) Notice: Subject to any disclaimer, the term of this patent is extended or adjusted under 35 U.S.C. 154(b) by 98 days.

(21) Appl. No.: 09/759,900

(22) Filed: Jan. 12, 2001

(65) Prior Publication Data

US 2002/0094855 A1 Jul. 18, 2002

(51) Int. Cl.[7] .................................................. A63F 13/00
(52) U.S. Cl. ............................................ 463/16; 463/25
(58) Field of Search ........................ 463/12, 13, 16–20, 463/25; 273/138.1, 138.2, 139, 143 R, 269

(56) References Cited

U.S. PATENT DOCUMENTS 5,800,269 A * 9/1998 Holch et al. .................. 463/18
6,012,983 A 1/2000 Walker et al.
6,168,521 B1 * 1/2001 Luciano et al. ............... 463/18
6,203,428 B1 * 3/2001 Giobbi et al. ................. 463/13
6,220,959 B1 * 4/2001 Holmes et al. ............. 273/292
6,312,334 B1 * 11/2001 Yoseloff .................. 273/138.1
6,369,727 B1 * 4/2002 Vincze ....................... 341/131
2002/0045474 A1 4/2002 Singer et al.

* cited by examiner

*Primary Examiner*—Mark Sager
*Assistant Examiner*—Steven Ashburn

(57) ABSTRACT

A method and apparatus is for aggregately playing multiple gaming activity events en masse, where the gaming activity events would otherwise require participation in a successive fashion. An aggregate play mode is initiated, and a number of gaming activity events to be associated with the aggregate play is identified. A random number set is generated for each gaming activity event included in the aggregate play, where each random number set corresponds to an individual payout result for its respective gaming activity event. A collective payout result is provided, which includes all of the individual payout results associated with the aggregate play.

31 Claims, 9 Drawing Sheets

METHOD AND APPARATUS FOR AGGREGATING GAMING EVENT PARTICIPATION

FIELD OF THE INVENTION

This invention relates in general to gaming systems and methods, and more particularly to a method and apparatus for allowing aggregate execution of a plurality of gaming events, to collectively provide the outcomes for the aggregately executed gaming events.

BACKGROUND OF THE INVENTION

Gaming devices, such as slot machines, have been in use in the U.S. for over a century. The earliest mechanical slot machines of over a century ago are markedly different than their contemporary counterparts. The dramatic disparities between contemporary machines and their ancestors results primarily through the advent of computers. The gaming industry has enjoyed a great deal of success in recent decades through the use of computerized or video gaming machines, and the excitement and interest in such gaming machines has rivaled, and even surpassed, their once untouchable table game counterparts.

The use of computerized gaming systems and video screens on gaming devices has provided a great deal of flexibility in the manner that the gaming activities are played. For example, the graphics presented on the computer-driven video screen can change the images presented, unlike the fixed reels on a purely mechanical slot machine. This has allowed for various features to be provided for during gaming activities, that increase the suspense, excitement, and enjoyment of gaming participation.

Excitement, enjoyment and convenience are but a few of the characteristics that gaming activity participants and casino-goers pursue. However, one aspect of existing gaming devices can, at times, be inconvenient to the gaming device user. At present, gaming devices require the user to enter a number of coins, tokens, vouchers, simulated coins, etc. to accrue one or more credits to wager. While some gaming devices allow the user to participate in multiple events at once, such as through the use of multiple paylines in a slot game, the user still must initiate each play (where "play" may include multiple paylines), which still results in one outcome. Some gaming devices allow the user to allocate many credits to a particular play, but these devices are simply increasing the number of paylines associated with that game, which requires that particular game to be configured for multiple paylines.

Because the prior art gaming systems require initiation of each play to produce each outcome, a gaming participant or casino goer who has accumulated credits on the gaming machine essentially has two options if the participant wants to discontinue playing that particular machine. First, the participant can cash out, where these remaining credits are returned to the user rather than played on the gaming device. Second, the participant can continue to independently wager credits (e.g., bet 1; bet max, etc.), each time obtaining a corresponding result. These options do not allow the user to both avoid spending the requisite time to play out all credits, and avoid having to cash out. For example, a casino patron being summoned to leave the casino by those who accompanied him/her to the casino would be unable to find out if the remaining credits would have resulted in a winning payout. Instead, the patron must simply cash out in order to leave at that time.

There are many other reasons in which a casino patron may want to leave a machine earlier than anticipated, although the patron may still want to play the credits on that machine. For example, a participant may believe a gaming machine to be "hot" or otherwise ready to provide a significant payout. The participant may enter or accumulate a number of credits, at which time a person who is a heavy smoker engages an adjacent gaming machine. If the participant wants to leave that area to escape the smoky atmosphere, yet wants to determine whether the accumulated credits would have produced the significant payout believed to be forthcoming by the participant, there is currently no way for the participant to satisfy both of these conditions.

An aspect in which computerized gaming systems can further benefit the gaming industry is thus by providing greater convenience to the gaming participant. A participant may want to discontinue play on a particular machine, but may want to determine whether any of the remaining credits would result in a payout. The present invention provides an aggregate play feature which presents a solution to the aforementioned and other problems of prior art gaming devices, and enhances gaming convenience to gaming participants. The present invention thus overcomes the aforementioned and other shortcomings of the prior art, and offers additional advantages over existing gaming approaches.

SUMMARY OF THE INVENTION

To overcome limitations in the prior art described above, and to overcome other limitations that will become apparent upon reading and understanding the present specification, the present invention discloses a method and apparatus for aggregately playing a number of gaming activity events en masse. A collective payout is provided in response to the aggregate execution of the multiple gaming events. In this manner, a participant may concurrently participate in gaming events that would otherwise require participation in a successive manner.

In accordance with one embodiment of the invention, a method is provided for facilitating aggregate participation in multiple gaming activity events. A request for aggregate play is received, as is an indication of a number of gaming activity events for inclusion in the aggregate play. A user may request aggregate play, which initiates an aggregate play feature received by the gaming system. The indication of the number of gaming activity events may be provided by the user, calculated from an accumulated credit total, governed by a predetermined number, and the like. A random number set is generated for each gaming activity event included in the aggregate play, where each random number set corresponds to an individual payout result for its respective gaming activity event. A collective payout result is provided, which includes all of the individual payout results associated with the aggregate play.

In accordance with another embodiment of the invention, a casino gaming apparatus is provided. A user interface is provided to allow a user to initiate an aggregate play mode, and to designate a number of gaming activity events for inclusion in the aggregate play. A random number generation module is configured to randomly generate an individual payout result for each of the gaming activity events included in the aggregate play. A processing module is configured to compute a collective payout result based on all of the individual payout results associated with the aggregate play. In accordance with another embodiment of a casino gaming apparatus, the user interface allows the user to initiate the aggregate play mode. A memory is provided to store the credit total accumulated by the gaming participant, and a processing module calculates the number of the gaming activity events supportable by the credit total. A random number generation module randomly generates an individual payout result for each of the number of gaming activity events supportable by the credit total. The processor further calculates a collective payout result that is mathematically based on all of the individual payout results associated with the aggregate play. In this manner, the user need only initiate the aggregate play mode to cause the casino gaming apparatus to allocate all of the remaining credits to the aggregate play, and to provide the collective payout result to the user.

Another method embodiment in accordance with the invention facilitates participation in gaming activities by a gaming participant. The method includes participating in the gaming activities in a standard mode where, each of the gaming activities is conducted in succession. A total number of credits is accumulated through the standard mode of participation. The participant initiates a "speed play" mode to facilitate concurrent participation in multiple gaming activities. A number of the gaming activities desired for concurrent participation is designated, and a commensurate amount of the total credits is allocated to this concurrent gaming participation. A combined payout based on individual payouts of each of the plurality of the gaming activities subject to concurrent participation is provided to the user.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a method and apparatus for aggregately playing a number of gaming activity events en masse. The gaming events are not individually and successively played by the user, but rather a random number generator module determines the resulting combinations of all of the gaming events identified for aggregate play. It is as if the participant played each gaming event in succession (i.e., the standard manner of play), however these gaming events are played collectively as different instances of the random number generator. In this manner, a "speed play" or "aggregate play" feature is provided, which is not merely increasing a wager amount for a particular gaming event, but rather is specially invoking a random number generation module, for a selected number of concurrent gaming events, that would otherwise be played in succession. Prior art gaming devices require the user to press a button or pull a handle on every play (even though the "play" may include multiple paylines), and produce one outcome for every play. The present invention provides for the generation of multiple outcomes at once, rather than generating one outcome at a time. Each of the concurrent gaming events is considered independent of one another, and requires no common thread running through each of the gaming events associated with the aggregate play. In other words, the aggregately-played gaming events do not need to be related or otherwise configured to be played contemporaneously. The present invention thus provides for the aggregate play of a desired number of independent gaming events.

The present invention, as described more fully below, is applicable to a variety of gaming activities that are played on a gaming machine, including slot games such as reel slots and video slots, electronic poker and other electronic card games, keno, craps, dice, roulette, etc. The present invention is, however, described in large part in the present description in terms of slot machines to provide an understanding of the invention. For example, in the context of slot games/machines, the present invention allows aggregate play of multiple slot games. While the invention is particularly advantageous in the context of slot machines, and while a description in terms of slot machines facilitates an understanding of the invention, the invention is equally applicable to other gaming activities of chance as will be readily apparent to those of skill in the art from the description provided herein.

Figure 1:
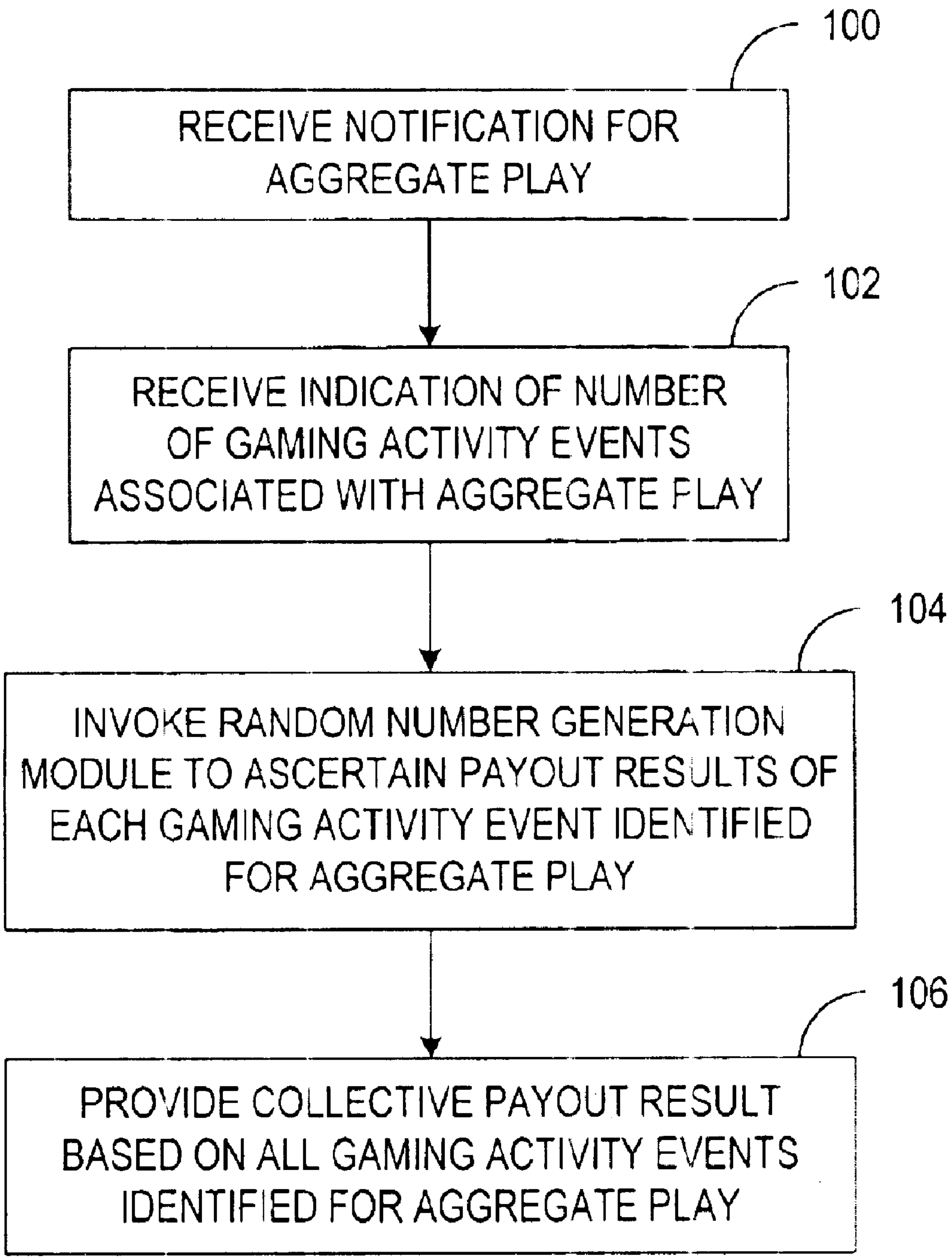
FIG. 1 is a flow diagram illustrating one embodiment of a method for invoking aggregate gaming play in accordance with the present invention.

FIG. 1 is a diagram illustrating one embodiment of a method for invoking aggregate gaming play in accordance with the present invention. A gaming device, such as a slot machine, receives a notification for aggregate play as shown at block 100. This notification may come in the form of a request by a user of the slot machine through a user interface. For example, the user may press a button on a slot machine, touch a segment of a touch-screen, enter text, enter voice commands, or other known user entry methodology. In yet a more specific example, a user can press a button for "Aggregate Play," "Speed Play," or the like on a slot machine, which readies the slot machine for play in accordance with the invention.

The user can enter the number of games that he/she would like to concurrently play. In this instance, an indication of the number of gaming activity events (e.g., slot games) associated with the aggregate play is received 102 at the slot machine. For example, the user may allocate a number of credits to be aggregately played, such as 30 credits, or a number of games to be played where each game is associated with a predetermined number of game credits.

In another example, a preconfigured number of "concurrent" games may be associated with the aggregate play feature. For example, a user interface may be configured to allow the user to, upon selection of this user interface option, play a predetermined number of games concurrently. In a more specific example, the user may press a "speed play" button which initiates the concurrent play of, for example, fifty slot games. The predetermined amount of fifty games allows the user to quickly determine the outcome of a significant number of games which would otherwise require successive participation. Options may exist so that the user may apply one credit to each of the games associated with the aggregate play (e.g., 50 credits total), or two credits to each of the games associated with the aggregate play (e.g., 100 credits total), etc. Further, any number of such concurrently-played games may be "preconfigured" as the aggregate play amount. In another embodiment, the user may change this predetermined amount, for example, to change the preconfigured amount from fifty to seventy-five.

In another embodiment, a predetermined number of games may be played in accordance with the aggregate play feature of the present invention in connection with a "bonus" round. Bonus events or games are used to attract and keep players at a gaming machine, and is typically an additional gaming reel or machine, or a random selection device, that is enabled by a bonus qualifying signal from an underlying or primary gaming machine. Generally, a predetermined prize-winning combination of symbols in an underlying game may result in the player being awarded one or more bonus games. Often the bonus event has a much higher probability of winning, thereby instilling a great interest by players in being awarded bonus events. The present invention may be used as a bonus round, such that obtaining a predetermined gaming result (e.g., symbol combination in a slot game) will present the participant with an aggregate play of a predetermined number of concurrent games to play. For example, in the context of a slot game, if a user hits a predetermined symbol combination, the user may be awarded twenty credits to be applied in an aggregate play bonus round. In such a bonus round, all bonus credits (e.g., twenty credits) are concurrently played as described herein. Any resulting winnings would then be added to the user's accumulated credit total. When implemented as a bonus round, the receipt of the indication of the number of gaming activity events associated with the aggregate play, as shown at block 102, is generated within the gaming machine and is based on the predetermined result of the bonus-generating gaming result obtained by the participant. In connection with such a bonus round, various different types of gaming activity events may be used. For example, where a predetermined number of forty credits is to be applied to fulfill a bonus round, twenty credits could be aggregately applied to a poker gaming activity, ten to keno games, and ten to slot games.

Upon receipt of the number of slot events desired for aggregate play, a random number generation module is invoked 104 to ascertain the payout results of each gaming activity event identified for aggregate play. In the case of a slot machine, the random number generation (RNG) module "spins" the electronic reels, that are used to display the result of the digital reels, which are actually stored in computer memory. RNGs are well-known in the art, and may be implemented using hardware, software operable in connection with a processor, or some combination of hardware and software. In order to determine the payout results of each of these gaming activity events, the RNG module may perform calculations in parallel, in series, or a combination thereof. For example, the RNG module may include one random number generator implemented, for example, using a processor operating under the control of software. The RNG module in this instance receives the desired number of gaming activity events for aggregate play, and can simply invoke the RNG that same number of times to generate results (e.g., slot machine symbol combinations) for each of the concurrent gaming events being played. This may be performed serially by such a processor or other RNG module, since the calculation of even a large number of gaming events can be accomplished so quickly that it is essentially instantaneous to the user. In another embodiment, multiple RNG modules can be configured in a parallel arrangement such that the result for each of the desired number of gaming activity events for aggregate play is determined concurrently. This can be performed in a variety of known manners, including the use of parallel hardware RNG modules, parallel processing, multi-tasking, parallel threads, and other known manners of processing tasks in parallel. RNGs are discussed in greater detail below.

A "collective" payout is provided 106, based on all of the gaming activity events identified for aggregate play. For example, assume the user had designated thirty credits for aggregate play of a slot machine, where thirty credits corresponds to thirty slot games. Invocation of the RNG module for all thirty games will result in a number of losing symbol combinations, and perhaps one or more winning symbol combinations. For instance, of the thirty slot games played, the RNG module results may indicate that twenty-seven games resulted in losing combinations, and three resulted in winning combinations. Of the three winning combinations, two winning combinations produced a total of ten new credits, and the remaining, less frequent winning combination produced a one hundred new credits. In this example, the user's collective payout is one hundred and ten credits. The user exploited the slot machine's ability, in accordance with the invention, to facilitate concurrent play of thirty credits, resulting in a collective winning payout of one hundred and ten credits.

Figure 2:
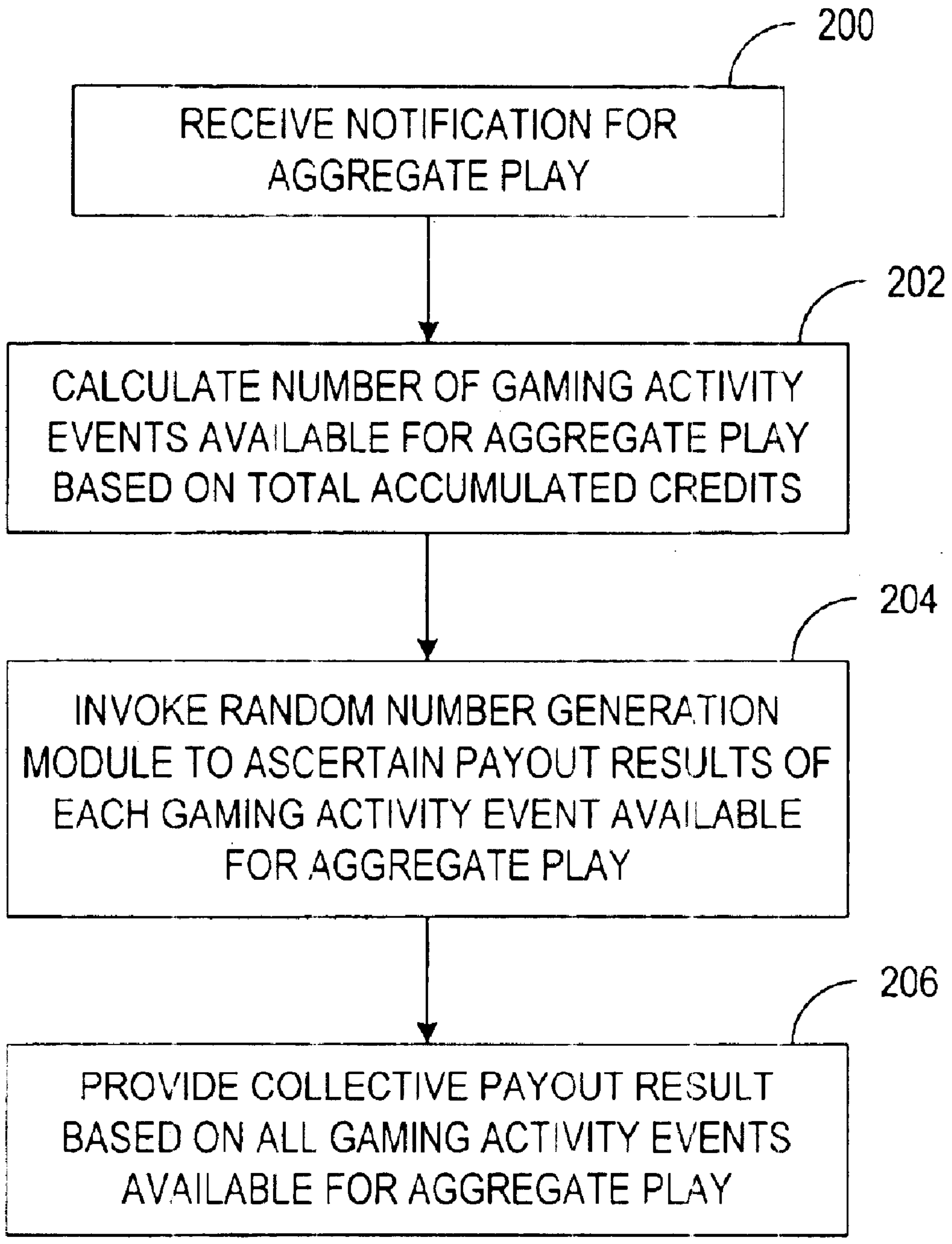
FIG. 2 is a flow diagram illustrating an embodiment of a method in accordance with the invention for invoking aggregate gaming play of all remaining credits.

A particularly useful embodiment of the present invention is illustrated in FIG. 2. This embodiment presents a method for invoking aggregate gaming play similar to the embodiment of FIG. 1. However, in this embodiment, the user is allowed to quickly play all remaining credits. In the context of a slot machine, this embodiment does not involve betting the entire amount on the one, two or three paylines of a particular "spin event." Rather, a standard wager amount is placed, and as many slot games will be aggregately and concurrently played as the credit amount will allow. For example, if the slot machine requires one credit for one play, and the user has accumulated forty credits, invoking this option will cause all remaining credits to be played on forty slot games. The user will be presented with the results of this concurrent play, and the user's credit amount will be adjusted upwards from zero if this aggregate play resulted in any winning payouts.

Referring now to FIG. 2, a gaming device, such as a slot machine, receives a notification for aggregate play as shown at block 200. The number of gaming activity events, such as slot games, is calculated at block 202. At block 202, the number calculated is the number of available gaming activity events that can be aggregately played based on the total accumulated credits of the user. In other words, once notification is received 200 for aggregate play, all remaining credits are automatically allocated to the aggregate play. In this manner, a gaming participant at a casino, for example, could quickly play any remaining credits if pressed for time or otherwise wanting to abandon that particular gaming machine.

Once the number of gaming events have been calculated 202, a random number generation module is invoked 204 to determine the payout results of each gaming activity event identified for aggregate play. A collective payout is provided 206, based on all of the gaming activity events that were collectively played.

Figure 3:
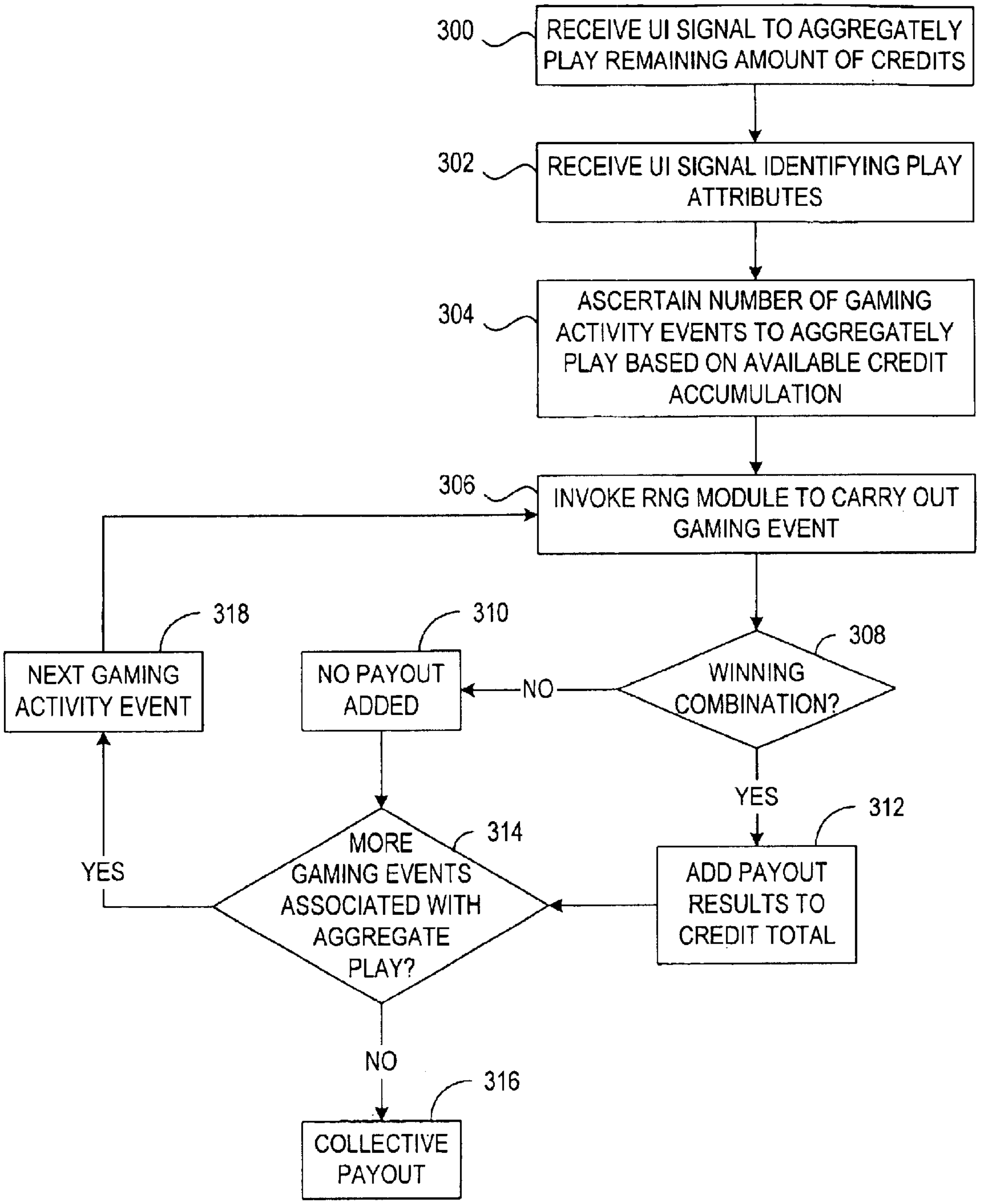
FIG. 3 is a flow diagram illustrating a more specific embodiment of invoking aggregate gaming play of all remaining credits.

Referring now to FIG. 3, a flow diagram illustrating a more specific embodiment of the invention is provided. In this example, block 300 illustrates that a user interface (UI) signal(s) is received to aggregately play the remaining amount of credits on a gaming machine. This UI signal may be a signal initiated by the user via pressing a button, touching a touch screen, verbal commands, keyboard entry, and the like. An additional UI signal(s) may be received 302 to identify play attributes, such as the number of coins/credits to be wagered on each gaming activity event (e.g., slot game), how many paylines are to be played for each gaming event, etc. The number of gaming events to be played en masse is ascertained 304 based on the available credit accumulation. For example, if the play attributes indicate that one credit is to be played for one payline per gaming event, and thirty credits have been accumulated on the gaming machine, then thirty gaming activity events will be aggregately played. Or, if the play attributes indicate that the user will play two credits for each game, fifteen gaming events will be performed. Another example is where the play attributes indicate that three paylines will be played, one credit per payline, and where the user has thirty credits accumulated. This would result in ten internal "spins" of the three paylines. In this case, ten plays (i.e., gaming activity events) are performed, each of which uses three paylines, resulting in thirty results associated with the ten gaming activity events. Thus, the participant can wager 1 credit on each game for a total of 50 credits, 2 credits on each game for a total of 100 credits, etc. and play this number of games concurrently. The play attributes may indicate other desired attributes associated with the game play as well, including allowing the player to bet different amount on different paylines, betting in a desired pattern, or other play attribute.

The remaining blocks describing the operation of the gaming events and random number generation are described and illustrated in a serial manner for purposes of illustration. However, the actual operation does not need to be performed serially. As previously described, the RNG module can simply be repeatedly invoked the appropriate number of times to generate results (e.g., slot machine symbol combinations) for each of the concurrent gaming events being played. This may be performed serially by such a processor or other RNG module, since the calculation of even a large number of gaming events can be accomplished so quickly that it is essentially instantaneous to the user. Alternatively, multiple RNG modules can be configured in a parallel arrangement such that the result for each of the desired number of gaming activity events for aggregate play is determined concurrently. Or, a combination of serial and parallel operations may be used. In any event, from the ensuing description of FIG. 3, one of ordinary skill in the art will readily appreciate that the implementation may be performed serially, in parallel, or some combination thereof.

Referring now to block 306, the random number generation (RNG) module is invoked to carry out the gaming event. Again, the actual implementation may be serial, parallel, or both, but for purposes of explanation it is described in a serial manner. When the RNG module has been invoked for a first of the gaming activity events being played en masse, it is determined 308 whether a winning combination is produced by the RNG module. A winning combination is one that matches a predetermined winning combination, such as three like symbols (i.e., three like units produced by the RNG module) in a slot game. If it is not a winning combination, the no payout is added 310 to the user's credit accumulation. If it is a winning combination, then a payout is added 312 to the credit total.

It is then determined 314 whether more gaming events are associated with the aggregate play, i.e., whether all of the allocated credits have yet been applied to and processed by the RNG. If all credits have been played, then a collective payout is provided 316. This collective payout may be represented by the accumulation of credits as payouts were added 312 to the credit total. Alternatively, the collective payout may represent the "cash out value" as the user cashes out all, or a portion of, the winnings from the payouts added at block 312.

In one particular embodiment, completion of the aggregate play may require the user to cash out any winnings resulting from this en masse play, rather than merely replenishing the user's credit bank. This keeps players from repeatedly wagering the entire credit accumulation until either winning a large jackpot, or losing the entire credit accumulation, which may be a very short time period. This in essence regulates the rate at which the user is allowed to wager, except for at the end of playing that particular machine where a one-time en masse play is allowed. It should be recognized that such an embodiment (where the user is required to cash out any winnings resulting from this en masse play) is a specific embodiment only, as other embodiments clearly allow the participant to continue to play, in either standard mode or aggregate play mode, after completing an aggregate play.

If it is then determined 314 that more gaming events are associated with the aggregate play, i.e., not all of the allocated credits have yet been applied to and processed by the RNG, then the next gaming activity event 318 is processed, and this continues until all of the gaming activity events identified for aggregate play have been processed. Again, while the flow diagram of FIG. 3 represents these operations in a serial fashion, the invention is not limited thereto. For example, multiple RNG modules may be activated in parallel, such that operations associated with blocks 306, 308, 310 and 312 would occur on each of the parallel RNG modules.

Figure 4:
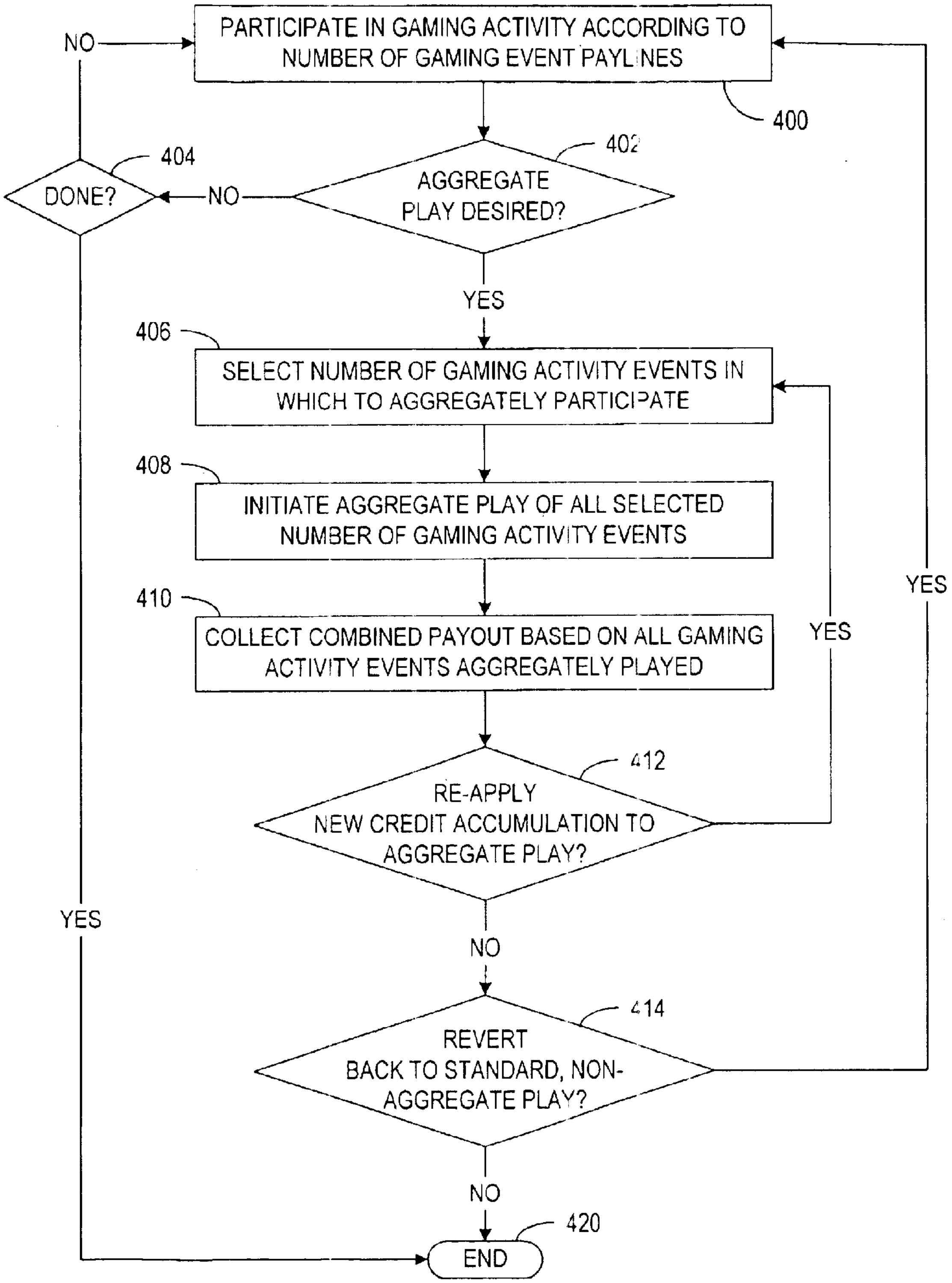
FIG. 4 is a flow diagram illustrating an embodiment of a method in which a user engages in aggregate gaming play in accordance with the present invention.

Referring now to FIG. 4, a flow diagram is provided illustrating an embodiment of a method in which a user engages in aggregate gaming play in accordance with the present invention. The user participates in the gaming activity, and participates in a desired number of paylines provided in connection with the particular game, as seen at block 400. The user decides 402 whether aggregate play is desired. If not, it is determined 404 whether the user is done participating in the gaming activity, and if so, the user's participation ends 420. If user is not done participating, the user can continue to participate in the gaming activity in the standard fashion as shown at block 400.

If the user chooses to participate in an aggregate play in accordance with the present invention, the user will select 406 a number of gaming activity events in which to aggregately participate. For example, the user may choose a certain number of slot games to play en masse. Alternatively, the user may opt to play the remaining credits accumulated on the user's gaming device. After the user has selected the number of gaming activity events in which to participate en masse, the user initiates 408 aggregate play of all gaming activity events identified for aggregate play. When the aggregate play is completed, the user will collect 410 a combined payout based on all gaming activity events that were aggregately played. The user can then determined 412 whether to reapply the new credit accumulation for continued aggregate play, and if so, the user will return to again select 406 a number of gaming activity events in which to aggregately participate. If the user decides not to reapply the new credit accumulation to an aggregate play, the user can decide whether or not to revert back to the standard, non-aggregate play. If so, the user returns to block 400, or the user participates in the gaming activity according to the number of gaming event paylines associated with that particular gaming activity. If the user decides not to revert back to the standard, non-aggregate play as determined at decision block 414, the user's participation ends 420. As described above, another option is available, where completion of the aggregate play forces the user to cash out any winnings resulting from this en masse play, rather than merely replenishing the user's credit bank, and allowing the user to reapply the new credit accumulation to further en masse plays.

It should be recognized that rather than the user having to "reselect" the number of gaming activity events in which to aggregately participate (see block 406) after deciding at block 412 to re-apply the new credit accumulation, the system may instead automatically repeat the same number of previously-selected gaming activity events for aggregate play. For example, if the user identified at block 406 the number of gaming events in which to aggregately participate to be twenty, and decided at block 412 to re-apply the new credit accumulation to another aggregate play event, twenty credits can be automatically selected as the new credit amount to be applied. In this manner, a player can repetitively play, for example, one hundred games at a time.

Figure 5:
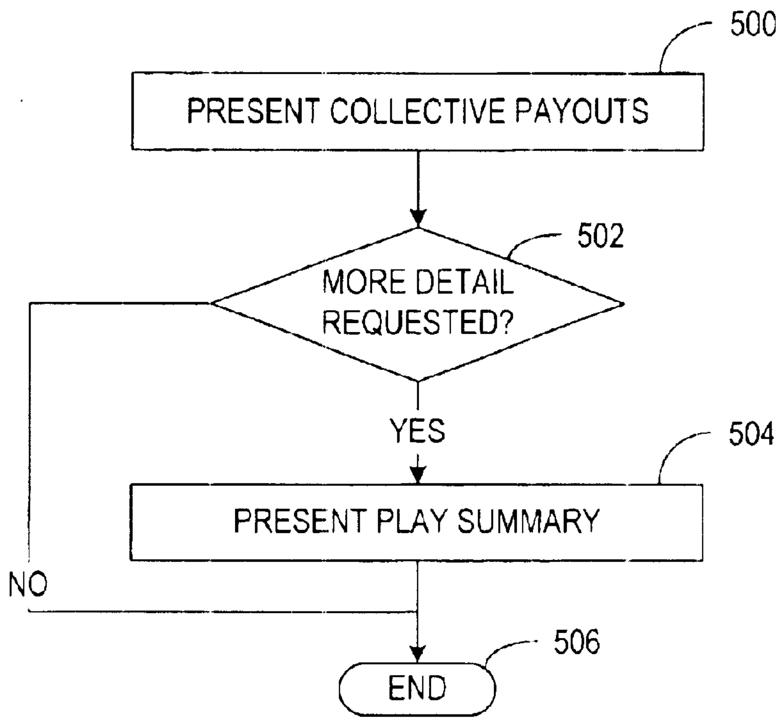
FIG. 5 illustrates an embodiment of operations occurring after the payout has been determined in accordance with the present invention.

As will be described in greater detail below, various options are provided in connection with the present invention as to how the user is presented with the results of the aggregate play. FIG. 5 is one embodiment of operations occurring after the payout has been determined, wherein FIG. 5 illustrates a "collective result" embodiment. In this embodiment, the payouts are presented 500 in a collective form. For example, a new credit accumulation may be presented to the user, which is a collective presentation of a single credit total accounting for the results of all the individual gaming activity events associated with the aggregate play. In this embodiment, the user may request more detail as illustrated at decision block 502. If the user does not make such a request, the presentation to the user ends 506. If the user requests more detail as determined at decision block 502, a play summary may be presented 504. In this manner, certain details may be presented to the user regarding each of the individual gaming activity events associated with the aggregate play. For example, a summary may include a table enumerating each of the individual gaming events, and its results. Each gaming event, such as a slot game symbol combination, may be presented to the user so that the user can see which one or more of the individual slot games produced a winning combination. A variety of different presentation features may be provided, some of which are described in further detail below.

Figure 6:
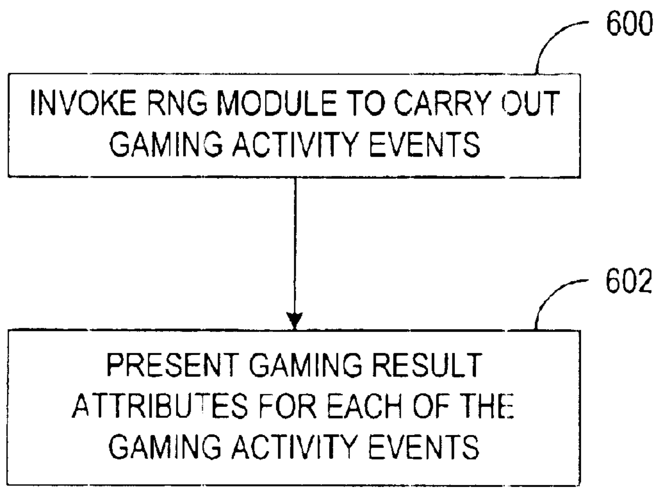
FIG. 6 illustrates an embodiment of operations occurring during payout determination in accordance with the present invention.

FIG. 6 is one embodiment of operations occurring during payout determination. In this embodiment, the RNG is invoked 600 to carry out the gaming activity events. The gaming result attributes are presented 602 for each of the gaming activity events carried out in connection with block 600. For example, a summary screen may be presented showing all of the winning combinations only. This may be presented in text form, graphic form, or other form. It may present the ability to enter or select a particular gaming activity event number that can be selected which thereafter reveals the results of that particular gaming activity event. Alternatively, certain ones of the gaming events such as all of the winning combinations can be shown by way of an instant replay on a video screen of a gaming device such as a slot machine.

In one embodiment, this is performed before the payout notification, in order to provide suspense to the user as to the ultimate payout result. For example, an aggregate play may result in a winning combination for three of thirty aggregately played games, at which time each of the three winning combinations are presented to the user on a video screen, either all at the same time, individually, or a predetermined number at the same time. If presented individually, each of the three winning combinations can be presented to the user one-at-a-time, showing the spinning reels in the case of a slot game, to provide the user with the suspense of perhaps winning a large jackpot. The user may know he/she is being presented with a winning presentation, but the user will not know whether it is a large or small jackpot. This "instant replay" of winning combinations determined during the aggregate play can be presented in a variety of other ways as well, such as concurrently presenting smaller versions of the spinning reels of all winning combinations.

Figure 7A:
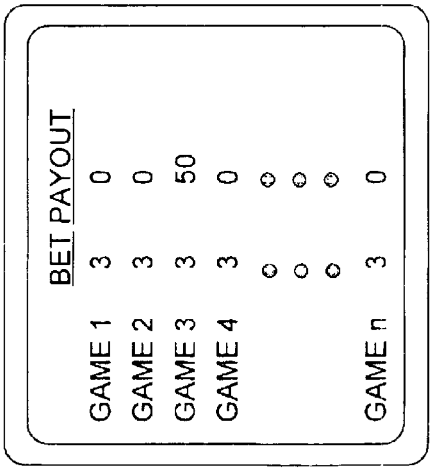
FIGS. 7A, 7B, 7C, 7D and 7E illustrate various embodiments of payout presentations used in connection with the aggregate play feature of the present invention.

FIGS. 7A, 7B, 7C, 7D and 7E illustrate various embodiments of payout presentations used in connection with the aggregate play feature of the present invention. FIG. 7A illustrates a textual summary screen, which can include any desired information relating to the results of the aggregate play. For example, each of the gaming activity events associated with the aggregate play may be listed, along with the bet amount and payout results for each of the gaming activity events. Alternatively, only winning gaming activity events may be displayed. Other desired information may be displayed as well.

Figure 7B:
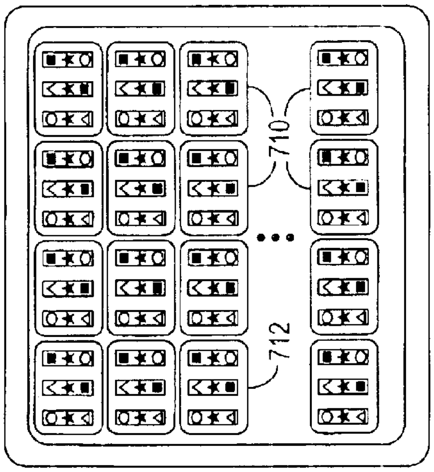

FIG. 7B illustrates an embodiment where each of the gaming activity event results of the aggregate play are displayed as small graphic images, thumbnails, or other representation of the resulting activity. In the example of FIG. 7B, the gaming activity event is a slot game, and each of the thumbnail images 710 represents the result of one of the slot games that was aggregately played. In accordance with another embodiment, the user can select one or more of the thumbnail images 710 in FIG. 7B, and the selected image(s) will be displayed. For example, selection of image

Figure 7C:
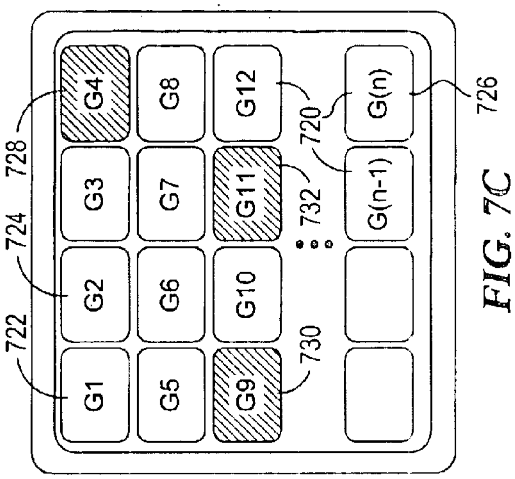
Figure 7D:
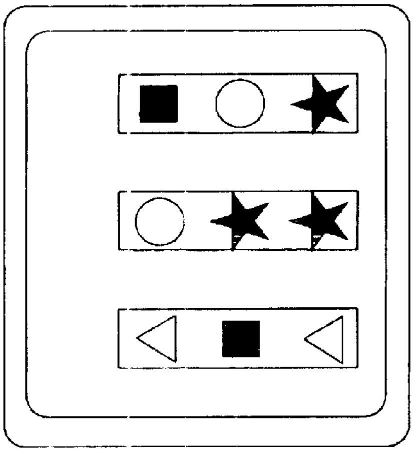

712 can be individually presented on the display, such as is shown in FIG. 7D. This allows the user to more clearly see the particular desired result.

FIG. 7C illustrates another embodiment where each of the gaming activity event results of the aggregate play is identified by selectable indicia, which in this example is a game number. For example, each of the game icons 720 is identified by a game number that represents one of the gaming activity events that was associated with the aggregate play. A first gaming activity event is identified by "G1" 722, a second is identified by "G2" 724, and so forth through gaming activity event "G(n)" 726, where n is the total number of gaming activity events played in the aggregate play. Optionally, gaming events associated with winning results can be set apart from the other, non-winning gaming events. For example, gaming activity events "G4" 728, "G9" 730 and "G1" 732 are shown as shaded, indicating that these produced winning gaming results. Any type of indication may be used to set the winning combinations apart from the others, including illumination, flashing, blinking, different colors, audio indications, or any other indication perceivable by the user. The user can then select each of the winning gaming results to view the actual winning result. For example, in the case of a slot game, selecting "G4" 728 may present a screen such as illustrated in FIG. 7D, showing the winning symbol combinations of that slot game.

The example of FIG. 7D also represents embodiments where the winning combinations (or all resulting combinations if desired) are individually presented to the user. For example, upon effecting an aggregate play, screen images can be displayed as in FIG. 7D that sequentially display each of the resulting winning combinations. This is in effect an "instant replay" of each of the winning combinations if the payout amount is already made known to the user. If the payout amount is not yet known to the user, these sequential displays of the resulting winning combinations significantly reduce time expenditure by only presenting winning combinations, and not displaying the gaming events that did not result in winning payouts.

Figure 7E:
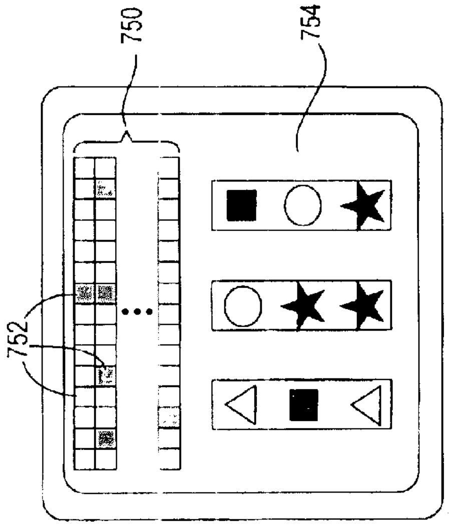

The example of FIG. 7E presents a desired one of the individual gaming activity events of the aggregate play upon its selection. A gaming event display area 750 provides a symbol for each of the games associated with the aggregate play. Winning results may be set apart from the non-winning results, such as by highlighting or otherwise changing the appearance of the symbol as shown by shaded symbols 752. Selection of a shaded symbol 752 will present that winning result, as shown in result presentation area 754. Selection of any symbol in gaming event display area 750 will present that result, whether winning or not.

It should be recognized that other similar manners of presenting winning combinations to the user may be employed, and are within the scope and spirit of the invention. It should also be recognized that no presentation is needed at all in connection with the invention, and simply providing the payout following the aggregate play may be the only action. The invention contemplates such presentations ranging from the most minimalist presentation to complex presentations.

Further, as previously discussed, these presentations may be provided before or after the user is notified of the payout amount. If the presentation is provided before the user knows the payout amount, the element of suspense is not lost. On the other hand, other embodiments provide the total payout amount when it becomes known (i.e., when the RNG module has derived the resulting combinations for all gaming events associated with the aggregate play). In this embodiment, the user is allowed to optionally view winning combinations if desired.

Figure 8:
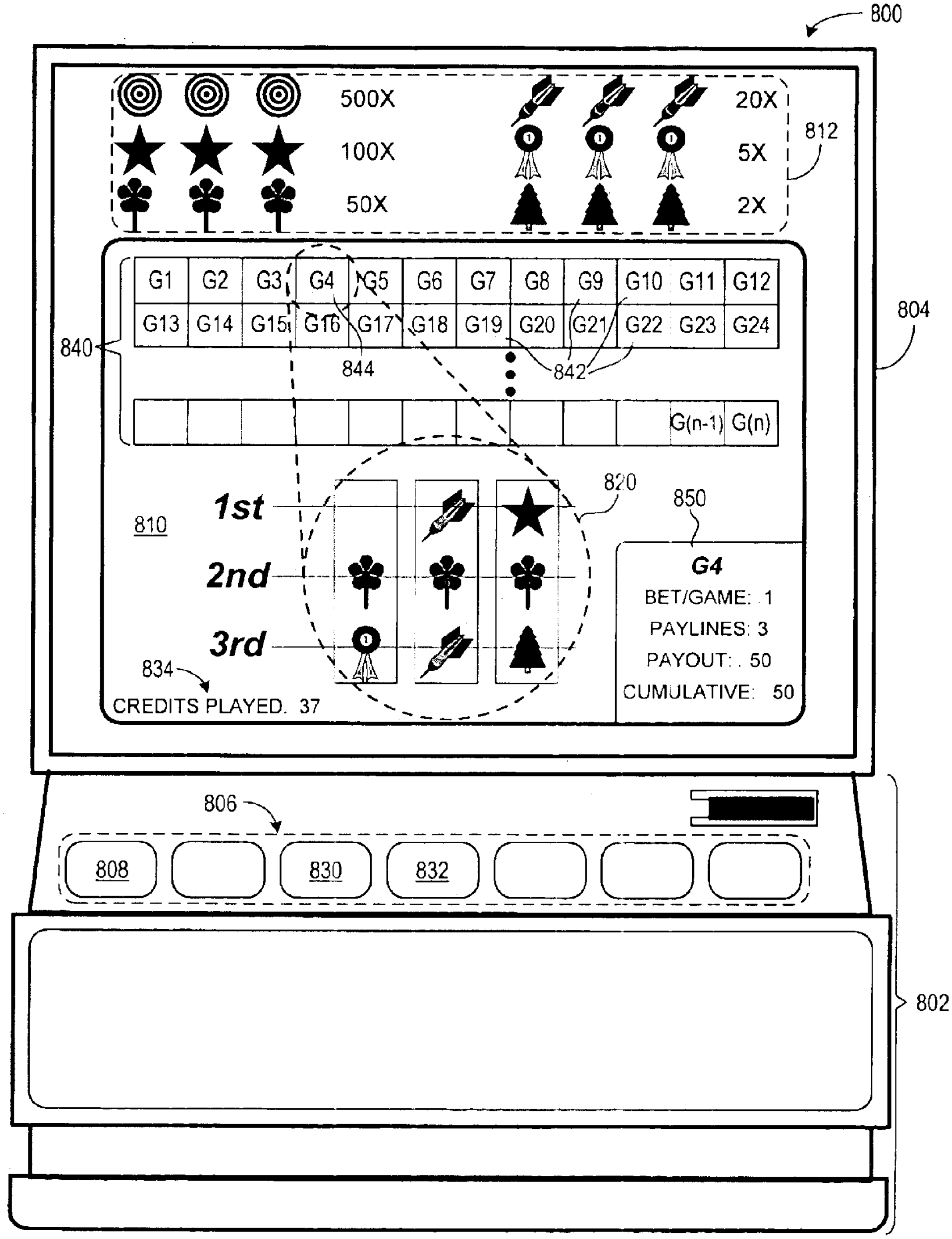
FIG. 8 is an embodiment of a casino-style gaming device in which the principles of the present invention may be applied.

FIG. 8 is an embodiment of a casino-style gaming device in which the principles of the present invention may be applied. Many traditional casino table games, such as blackjack, craps, etc. or other traditionally mechanical casino games such as roulette, may be provided in a "video game" available via a casino-style gaming device shown in FIG. 8. For purposes of explanation, the description of the gaming device is FIG. 8 is provided in terms of a slot machine 800. However, the present invention is analogously applicable to other casino-style games, such as keno, video poker, etc. Generally, games of chance such as slot games, keno, etc. are very well suited for use in connection with the present invention, as they require no "during-play" actions to be performed by the user. Poker and other casino-style games may require the user to take some action during play (e.g., to hold or draw cards in a video poker game). The aggregate play feature of the present invention may be applied to such gaming activities, however the user would agree to allow the gaming machine computer to make the appropriate selections, such as where it is based on statistics. As a more particular example, the user can agree to allow the computer to hold/draw cards for each poker game concurrently played in an aggregate play video poker game, where the computer would simply decide whether to hold or draw cards based on predetermined statistical probabilities of success or a schedule of how that machine actually plays.

The slot machine 800 is a structure including at least a computing system, a housing, and a display. The housing includes a base 802 and a display device 804 to allow the example slot machine 800 to be a self-supported, independent structure. The base 802 includes structure supporting the slot machine 800, and also includes a user interface 806 to allow the user to control and engage in play of the slot machine 800. The particular user interface mechanisms associated with user interface 806 is dependent on the type of gaming machine. For example, the user interface 806 may include one or more buttons, switches, joysticks, levers, pull-down handles, trackballs, voice-activated input, or any other user input system or mechanism that allows the user to play the particular gaming activity. The user input 806 allows the user to enter coins or otherwise obtain play credits through vouchers, tokens, credit cards, etc. Various mechanisms for entering such vouchers, tokens, credit cards, coins, etc. are known in the art, and are applicable to the invention. For example, coin/token input mechanisms, card readers, credit card readers, smart card readers, punch card readers, and other mechanisms may be used to enter wagers. It is through the user input 806 that the user can initiate play, and make selections throughout play. In the case of a slot machine, the user input may include a plurality of buttons 808 allowing the user to enter a number of credits to play, identify the number of paylines in which to participate, cash out, automatically bet the maximum amount and paylines, etc. The buttons 808, or other user interface, can also allow the user to make other control decisions, such as initiating the aggregate play feature of the invention, entering the number of credits to be applied to the aggregate play, as well as many others.

The user input 806 also allows the user to make selections and identifications in accordance with the invention. For example, the user input 806 allows the user to identify resulting combinations to be presented on the display 804, as was described in connection with FIGS. 7A–7E. The user interface 806 may also be used to enter play attributes (see, e.g., block 302 of FIG. 3), such as the number of coins/credits to be wagered on each slot game, how many paylines are to be played for each slot game, and the like. The particular user input chosen to facilitate the operations and functions of the present invention may change depending on preferences of the gaming device designer. Further, a wide variety of user input configurations and mechanisms are known in the art which may be used in connection with the present invention.

The display device 804 includes a display screen 810. As described in connection with FIGS. 7A–7E, the display device may take on a variety of forms depending on what type presentation is to be provided (if any). Also associated with the display device 804 is an optional winning guide area 812, where information associated with the potential winning symbol combinations may be presented. This information may be part of the display screen 810, or alternatively may be separate from the display screen 810 and provided directly on a portion of the display device 804 structure itself. For example, a backlit colored panel may be used as the winning guide area 812.

The display screen 810 of the present example includes a slot game presentation 820. The slot game presentation 820 presents the reels, or video reels, associated with the slot game normally played on the slot machine 800. As described more fully below, and illustrated in FIG. 8, the slot game presentation 820 can also present the reel images associated with certain slot games associated with an aggregate play.

An example of the aggregate play feature of the present invention is now described. The user may press a UI button 830 to initiate the aggregate play feature. Optionally, the user may press UI button 832, or a combination of other buttons, keyboard entry, etc. to enter the number of slot games to be played with the aggregate play. The UI 806 may also allow the user to play all accumulated credits upon initiating aggregate play. In the instant example, the user has opted to play thirty-seven credits, shown in credit display field 834 (without regard to whether or not this credit amount corresponds to the remaining credits or a designated number of credits).

The RNG module is activated, which generates results of each of the slot games being played en masse. A gaming event display area 840 provides a symbol for each of the games associated with the aggregate play. Winning results may be set apart from the non-winning results, such as by highlighting or otherwise changing the appearance of the symbol as shown by shaded symbols 842. Selection of shaded symbol 844 corresponding to slot game "G4" presents that winning result in slot game presentation area 820. These symbols may be selected through the UI 806. The game summary field 850 provides information such as, for example, the bet placed for that slot game, the number of paylines played, payout information, cumulative credit information, etc. In the illustrated embodiment, the game summary field 850 provides the bet amount (e.g., $1), the number of paylines to play on the particular secondary machine (e.g., three paylines), the payout information (e.g., 50 credits due to a winning combination on the $2^{nd}$ payline), and the cumulative credit total (e.g., 50 credits).

Figure 9:
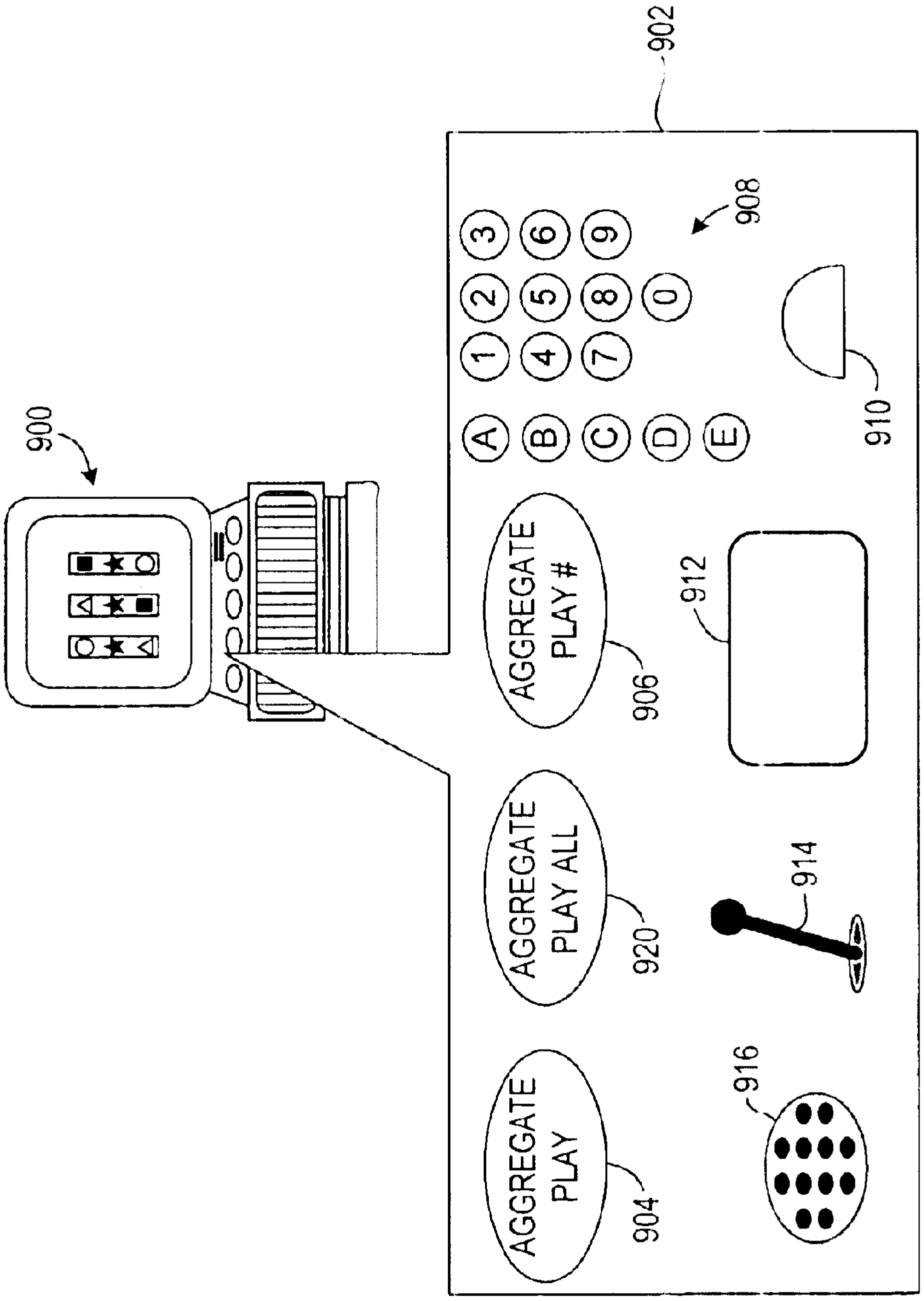
FIG. 9 is a block diagram illustrating embodiments in which the user can effect the aggregate play features in accordance with the present invention.

FIG. 9 is a block diagram illustrating embodiments in which the user can effect the aggregate play features in accordance with the present invention. The user of slot machine 900 uses a user input interface such as input interface 902. The user may press the aggregate play button 904 to notify the system that an increased number of slot games are to be played, and may subsequently press the aggregate play number button 906 to indicate that a desired number of credits is to be applied to the aggregate play. The number of credits may be entered in a variety of ways, including keypad 908, trackball 910, touch screen 912, joystick control 914, audio command input via microphone 916, etc. Alternatively, the user may press the aggregate play all button 920 to automatically allocate all accumulated credits to the aggregate play.

It should be recognized that any type of user interface may be used in connection with the present invention, and the invention is not limited to any particular type of user interface. For example, the functions associated with a few UI buttons may change, and the function associated with a particular button at a particular time may be displayed on a portion of the display device proximate the UI button. In this manner, fewer UI buttons would be required, as the computer and display essentially modify the operation associated with the UI buttons. A wide variety of other user interface options are also available for use in connection with the present invention.

Figure 10:
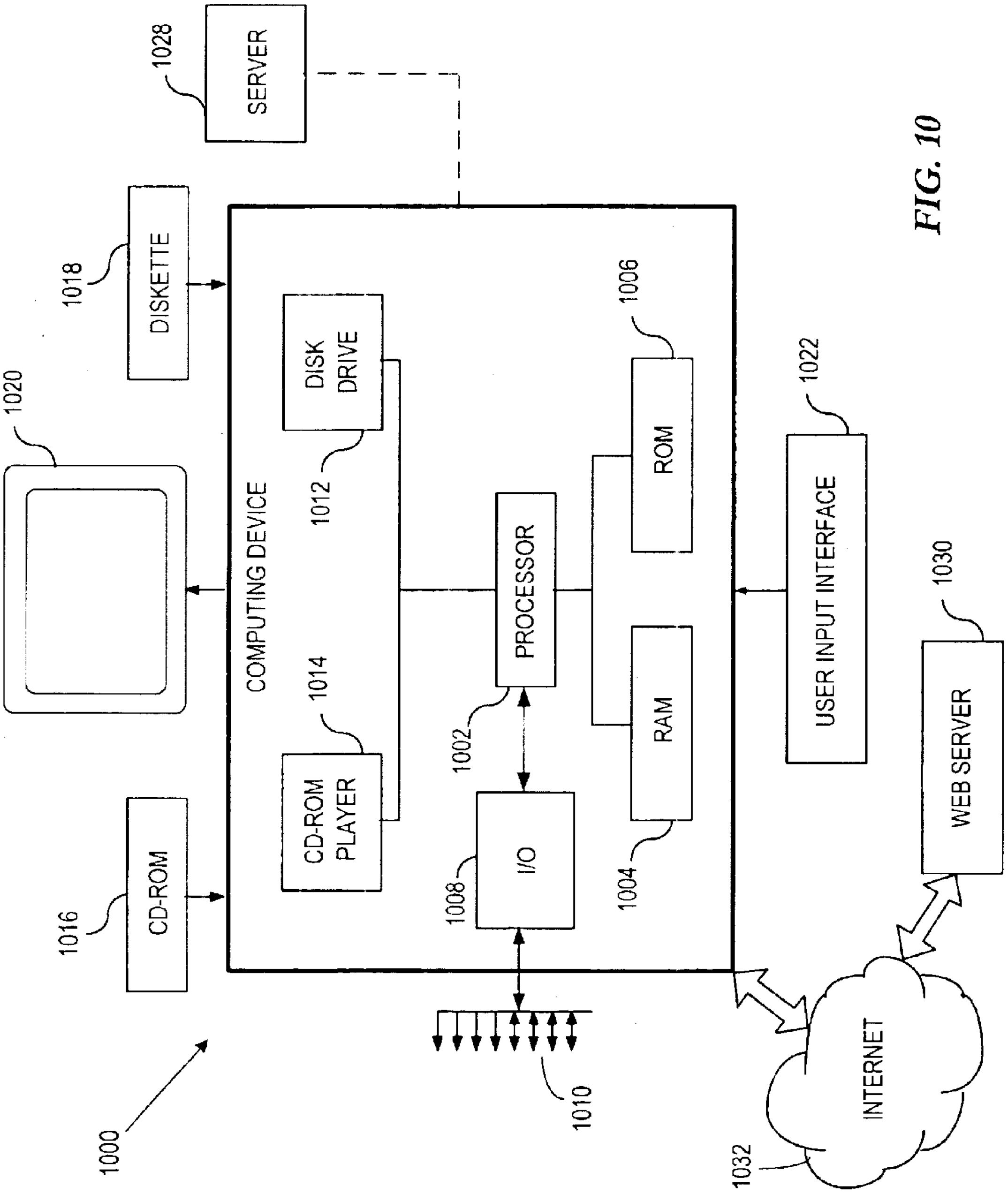
FIG. 10 is a block diagram of an example computing structure that can be used in connection with electronic gaming machines, computers, or other computer-implemented devices to carry out operations of the present invention.

The gaming machines described in connection with the present invention may be independent casino gaming machines, such as slot machines or other special purpose gaming kiosks, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 10.

Hardware, firmware, software or a combination thereof may be used to perform the various slot gaming functions and multiple display presentation functions and operations described herein. The functional modules used in connection with the invention may reside in a gaming machine as described, or may alternatively reside on a stand-alone or networked computer. An example computing structure that can be used in connection with such electronic gaming machines, computers, or other computer-implemented devices to carry out operations of the present invention is illustrated in FIG. 10.

The example computing arrangement 1000 suitable for performing the gaming and aggregate play functions in accordance with the present invention typically includes a central processor (CPU) 1002 coupled to random access memory (RAM) 1004 and read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are well-known in the art, and may be implemented using hardware, software operable in connection with the processor 1002, or some combination of hardware and software. In accordance with generally known technology in the field of slot machines, the processor 1002 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 1020. The present invention is operable using any known RNG, and because RNGs are well known in the art, no further description need be provided herein.

The computing arrangement 1000 may also include one or more data storage devices, including hard and floppy disk drives 1012, CD-ROM drives 1014, and other hardware capable of reading and/or storing information such as DVD, etc. In one embodiment, software for carrying out the gaming and aggregate play operations in accordance with the present invention may be stored and distributed on a CD-ROM 1016, diskette 1018 or other form of media capable of portably storing information. These storage media may be inserted into, and read by, devices such as the CD-ROM drive 1014, the disk drive 1012, etc. The software may also be transmitted to the computing arrangement 1000 via data signals, such as being downloaded electronically via a network, such as the Internet. The computing arrangement 1000 is coupled to a display 1020, which represents a display on which the one or more gaming activity and aggregate play activities are presented. The display 1020 merely represents the "presentation" of the video information in accordance with the invention, and may be any type of known display or presentation screen, such as LCD displays, plasma display, cathode ray tubes (CRT), etc. Where the computing device 1000 represents a stand-alone or networked computer, the display 1020 may represent a standard computer terminal or display capable of displaying multiple windows, frames, etc. Where the computing device is embedded within an electronic gaming machine, such as slot machine 800 of FIG. 8, the display 1020 corresponds to the display screen 810 of FIG. 8. A user input interface 1022 such as a mouse or keyboard may be provided where the computing device 1000 is associated with a standard computer. An embodiment of a user input interface 1022 is illustrated in connection with an electronic gaming machine 800 of FIG. 8 as the various "buttons" 808. Other user input interface devices include a keyboard, a mouse, a microphone, a touch pad, a touch screen, voice-recognition system, etc.

The computing arrangement 1000 may be connected to other computing devices, such as on a network. The computing arrangement 1000 may be connected to a network server 1028 in an intranet or local network configuration. The computer may further be part of a larger network configuration as in a global area network (GAN) such as the Internet. In such a case, the computer accesses one or more web servers 1030 via the Internet 1032.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The foregoing description of the illustrated embodiments of the invention has been presented for the purposes of illustration and description. It is not intended to be exhaustive or to limit the invention to the precise form disclosed. Many modifications and variations are possible in light of the above teaching. It is thus intended that the scope of the invention be limited not with this detailed description, but rather by the claims appended hereto.

What is claimed is:

1. A method for effecting concurrent play of all remaining gaming activity events that would otherwise be carried out successively by a gaming participant, the method comprising:

receiving a participant-initiated request for aggregate play;

determining a credit total accumulated by the gaming participant;

allocating all remaining credits supportable by the credit total to the aggregate play by calculating a number of the gaming activity events supportable by the credit total and generating a random number set for each calculated number of gaming activity events associated with the aggregate play, wherein each random number set corresponds to an individual payout result for its respective gaming activity event; and providing a collective payout result including all of the individual payout results associated with the aggregate play.

2. The method as in claim 1, wherein calculating a number of the gaming activity events supportable by the credit total comprises dividing the credit total by the number of credits required for each of the gaming activity events.

3. The method as in claim 1, wherein the gaming activity events includes multiple paylines, and wherein calculating a number of the gaming activity events supportable by the credit total comprises dividing the credit total by the number of credits required for each multiple-payline gaming activity event.

4. The method as in claim 1, further comprising presenting information relating to one or more of the gaming activity events associated with the aggregate play.

5. The method as in claim 4, wherein presenting information relating to one or more of the gaming activity events comprises providing a representation of the one or more gaming activity events.

6. The method as in claim 5, wherein presenting a representation includes presenting a visual representation of the one or more gaming activity events on a display.

7. The method as in claim 6, further comprising presenting, prior to providing the collective payout result, the visual representation of the gaming activity events that resulted in winning individual payout results.

8. The method as in claim 4, wherein presenting information comprises presenting gaming activity summary information for selected ones of the gaming activity events, wherein the summary information includes a value corresponding to the individual payout result for each of the selected gaming activity events.

9. The method as in claim 4, further comprising presenting a selectable list of the gaming activity events associated with the aggregate play, and wherein presenting information comprises presenting the information relating to one or more of the gaming activity events selected by the player from the selectable list.

10. The method as in claim 9, wherein presenting the information relating to one or more of the gaming activity events selected by the player from the selectable list comprises providing a visual representation of the selected gaming activity events on a display.

11. The method as in claim 10, wherein more than one of the selected gaming activity events are visually represented concurrently on the display.

12. The method as in claim 10, wherein the selected gaming activity events are visually represented individually and in sequence on the display.

13. The method as in claim 4, wherein presenting information relating to one or more of the gaming activity events comprises presenting information relating to the gaming activity events that resulted in winning individual payout results.

14. The method of claim 13, wherein presenting information comprises presenting a replay of winning combinations of the individual payout results associated with the aggregate play.

15. The method of claim 14, wherein presenting a replay of winning combinations comprises presenting the replay prior to providing the collective payout result.

16. The method of claim 14, wherein presenting a replay of winning combinations comprises presenting the replay contemporaneously with or after providing the collective payout result.

17. The method of claim 14, wherein presenting a replay of winning combinations comprises presenting a sequential replay of reel spins and reel results for each of the winning combinations of the individual payout results associated with the aggregate play.

18. The method as in claim 4, further comprising presenting the information relating to one or more of the gaming activity events requested by the player to be presented.

19. The method as in claim 1, further comprising receiving player-selected play attributes that identify one or more options associated with play of the gaming activity events.

20. A casino gaming apparatus, comprising:

a user interface to allow a user to initiate an aggregate play mode;

a memory to store a credit total accumulated by the gaming participant;

a processor configured to calculate a number of the gaming activity events supportable by the credit total;

a random number generation module configured to randomly generate an individual payout result for each of the number of gaming activity events supportable by the credit total;

wherein the processor is further configured to calculate a collective payout result mathematically based on all of the individual payout results associated with the aggregate play, and whereby the user need only initiate the aggregate play mode to cause the casino gaming apparatus to allocate all remaining credits to the aggregate play and provide the collective payout result.

21. The casino gaming apparatus as in claim 20, further comprising a display device, and wherein the processor is further configured to present the collective payout result to the user via the display device.

22. The casino gaming apparatus as in claim 20, wherein the random number generation module comprises a programmed portion of the processor.

23. The casino gaming apparatus as in claim 20, wherein the random number generation module comprises a random number generator configured to generate the individual payout results for each of the gaming activity events included in the aggregate play in series.

24. The casino gaming apparatus as in claim 20, wherein the random number generation module comprises a plurality of random number generators coupled to operate in parallel, and configured to concurrently generate at least some of the individual payout results for the gaming activity events included in the aggregate play.

25. The casino gaming apparatus as in claim 20, wherein the casino gaming apparatus is a slot machine, and wherein the random number generation module generates slot symbol combinations from which the individual payout results are derived.

26. The casino gaming apparatus as in claim 20, wherein the casino gaming apparatus is video keno machine, and wherein the random number generation module generates number combinations from which the individual payout results are derived.

27. The casino gaming apparatus as in claim 20, wherein the casino gaming apparatus is a video poker machine, and wherein the random number generation module generates poker hands, based on predetermined draw/bold rules, from which the individual payout results are derived.

28. The casino gaming apparatus as in claim 20, wherein the casino gaming apparatus is a video bingo machine, and wherein the random number generation module generates bingo numbers from which the individual payout results are derived.

29. The casino gaming apparatus as in claim 20, wherein the casino gaming apparatus is a chance-based gaming machine, and wherein the random number generation module generates random numbers used in the chance-based game from which the individual payout results are derived.

30. A method in which a gaming participant participates in gaming activities, comprising:

participating in the gaming activities in a standard mode where each of the gaming activities is conducted in succession;

accumulating a total number of credits through the standard mode of participation of the gaming activity;

initiating a speed play mode to participate in a plurality of the gaming activities concurrently;

designating, by way of input by the gaming participant via a user interface, a number of the plurality of the gaming activities desired for concurrent participation and allowing allocation of a commensurate amount of the total number of credits;

collecting a combined payout based on individual payouts of each of the plurality of the gaming activities subject to concurrent participation; and allocating the accumulated total number of credits in their entirety to the speed play.

31. The method of claim 30, wherein designating the number of the plurality of the gaming activities desired for concurrent participation comprises calculating a number of the gaming activity events available for allocation to the speed play, based on an expenditure of the accumulated total number of credits.

* * * * *

UNITED STATES PATENT AND TRADEMARK OFFICE

CERTIFICATE OF CORRECTION

PATENT NO. : 6,709,331 B2
DATED : March 23, 2004
INVENTOR(S) : Berman

It is certified that error appears in the above-identified patent and that said Letters Patent is hereby corrected as shown below:

Column 18,
Line 39, "draw/bold" should be read -- draw/hold --.

Signed and Sealed this

Tenth Day of August, 2004

JON W. DUDAS
*Acting Director of the United States Patent and Trademark Office*